(12) United States Patent
Cattaneo

(10) Patent No.: US 11,493,071 B2
(45) Date of Patent: Nov. 8, 2022

(54) JOINING DEVICE WITH MINIMUM VISIBILITY FOR PARTS OF FURNITURE AND FURNISHING ITEMS

(71) Applicant: Leonardo S.r.l., Figino Serenza (IT)

(72) Inventor: Carlo Cattaneo, Figino Serenza (IT)

(*) Notice: Subject to any disclaimer, the term of this patent is extended or adjusted under 35 U.S.C. 154(b) by 0 days.

(21) Appl. No.: 17/124,096

(22) Filed: Dec. 16, 2020

(65) Prior Publication Data

US 2021/0102567 A1 Apr. 8, 2021

Related U.S. Application Data

(63) Continuation of application No. 15/579,209, filed as application No. PCT/EP2016/065527 on Jul. 1, 2016, now Pat. No. 10,962,037.

(30) Foreign Application Priority Data

Jul. 7, 2015 (IT) .......................... 102015000031402

(51) Int. Cl.
*F16B 12/20* (2006.01)
*F16B 12/10* (2006.01)

(52) U.S. Cl.
CPC .......... *F16B 12/2036* (2013.01); *F16B 12/10* (2013.01); *F16B 2012/106* (2013.01)

(58) Field of Classification Search
CPC ..... A47B 96/027; A47B 96/066; F16B 5/008; F16B 5/0614; F16B 12/10; F16B 12/2027; F16B 12/2036; F16B 12/2054; F16B 12/2063; F16B 2012/106; F16B 2012/2045; Y10T 403/1674; Y10T 403/4602; Y10T 403/553; Y10T 403/556; Y10T 403/7096; Y10T 403/73

USPC ................ 403/20, 231, 294, 296, 382, 403, 403/DIG. 10, DIG. 12

See application file for complete search history.

(56) References Cited

U.S. PATENT DOCUMENTS

| | | | | |
|---|---|---|---|---|
| 3,865,051 A | * | 2/1975 | Johl | F16B 12/2036 108/132 |
| 4,131,376 A | * | 12/1978 | Busse | F16B 12/2036 403/231 |
| 4,202,645 A | * | 5/1980 | Giovannetti | F16B 12/2009 403/231 |
| 4,381,876 A | * | 5/1983 | Fenwick | A47F 3/00 312/111 |
| 4,599,011 A | * | 7/1986 | Tashiro | F16B 12/2036 403/DIG. 12 |
| 4,728,215 A | * | 3/1988 | Martincic | F16B 12/2036 403/231 |
| 4,810,127 A | * | 3/1989 | Hettich | F16B 12/2036 403/231 |

(Continued)

FOREIGN PATENT DOCUMENTS

| | | | | |
|---|---|---|---|---|
| CH | 311753 A | * | 12/1955 | .......... F16B 12/2036 |
| DE | 2227553 A1 | * | 1/1973 | .......... F16B 12/2063 |

(Continued)

*Primary Examiner* — Josh Skroupa
(74) *Attorney, Agent, or Firm* — Themis Law

(57) ABSTRACT

A joining device with minimum visibility for parts of furniture and furnishing items, in particular connecting a first panel to a second panel, which must be moved towards each other in an approach direction to bring the edge of one panel buffered in a tightening position against a surface of the other panel, includes a blocking group and a connection group assembled on the panels. The blocking group is inserted inside a seat contained in the thickness of the panel on which the blocking group is applied, and the seat has a longitudinal axis perpendicular to the approach direction, and extending from an edge towards the inside of the panels.

3 Claims, 17 Drawing Sheets

(56) References Cited

U.S. PATENT DOCUMENTS

| | | | | |
|---|---|---|---|---|
| 4,869,564 A | * | 9/1989 | Lechman | F16B 12/2036 403/231 |
| 4,883,383 A | * | 11/1989 | Challis | F16B 12/2036 403/DIG. 12 |
| 5,375,923 A | * | 12/1994 | Hall | A47B 88/956 403/DIG. 12 |
| 6,142,700 A | * | 11/2000 | Grieser | F16B 12/2036 403/DIG. 12 |
| 6,848,855 B2 | * | 2/2005 | Hasler | F16B 12/2036 403/DIG. 12 |
| 7,223,045 B2 | * | 5/2007 | Migli | F16B 12/2009 403/231 |
| 8,714,863 B2 | * | 5/2014 | Vallance | F16B 12/2036 403/DIG. 12 |
| 8,794,864 B2 | * | 8/2014 | Vallance | F16B 12/2036 403/DIG. 12 |
| 9,847,599 B2 | * | 12/2017 | Concilio | F16B 12/2036 |
| 10,495,125 B2 | * | 12/2019 | Migli | F16B 12/2036 |
| 2010/0021231 A1 | * | 1/2010 | Herbstreit | F16B 12/2036 403/408.1 |

FOREIGN PATENT DOCUMENTS

| | | | | |
|---|---|---|---|---|
| DE | 2643354 A1 | * | 3/1978 | F16B 12/2036 |
| DE | 2855216 A1 | * | 7/1979 | F16B 12/2036 |
| EP | 0378118 A2 | * | 7/1998 | F16B 12/2063 |
| EP | 1860331 A1 | * | 11/2007 | F16B 12/2036 |
| FR | 2360780 A1 | * | 3/1978 | F16B 12/2009 |
| GB | 964917 A | * | 7/1964 | F16B 12/2036 |
| GB | 1174319 A | * | 12/1969 | F16B 12/2036 |

* cited by examiner

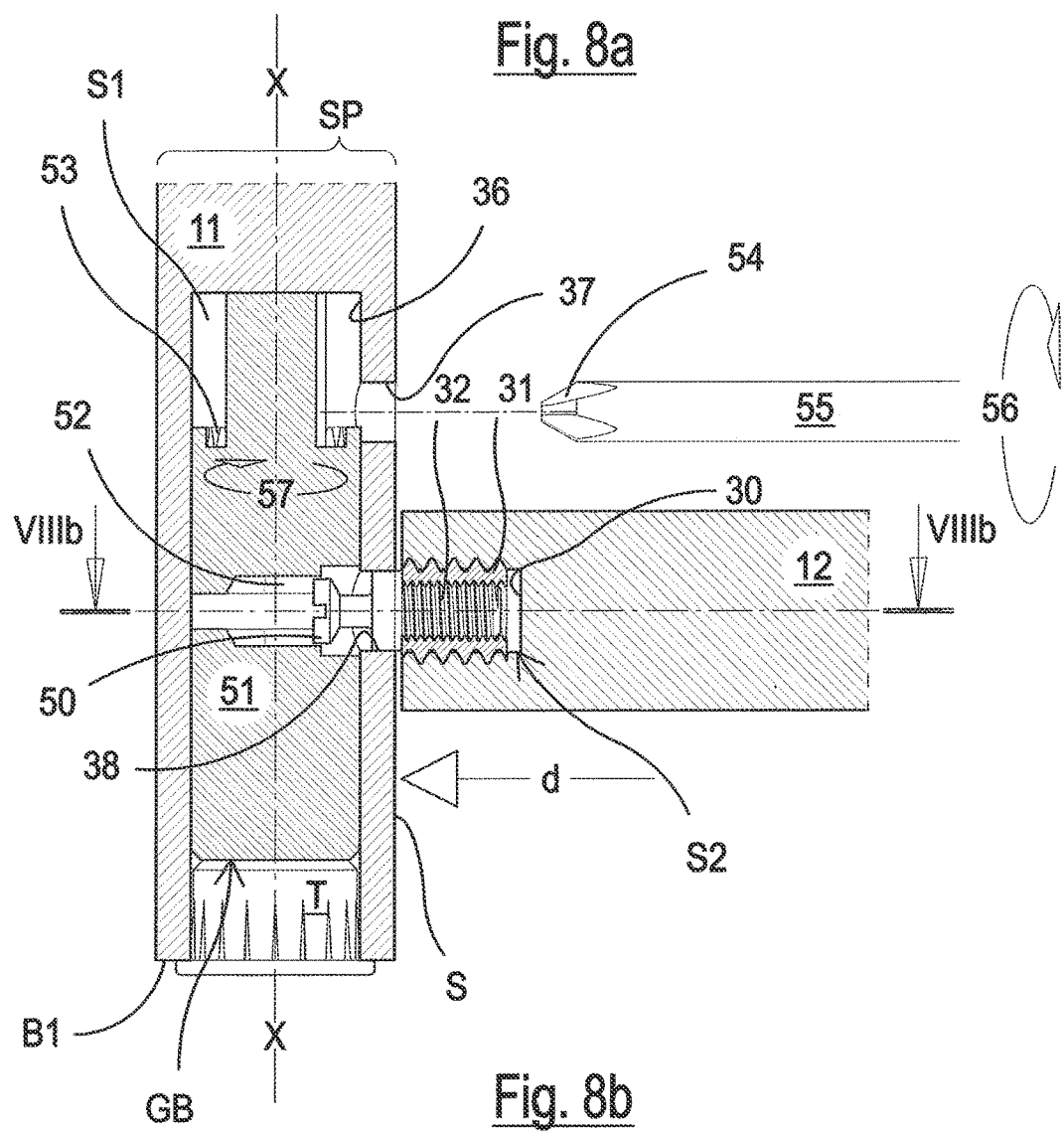
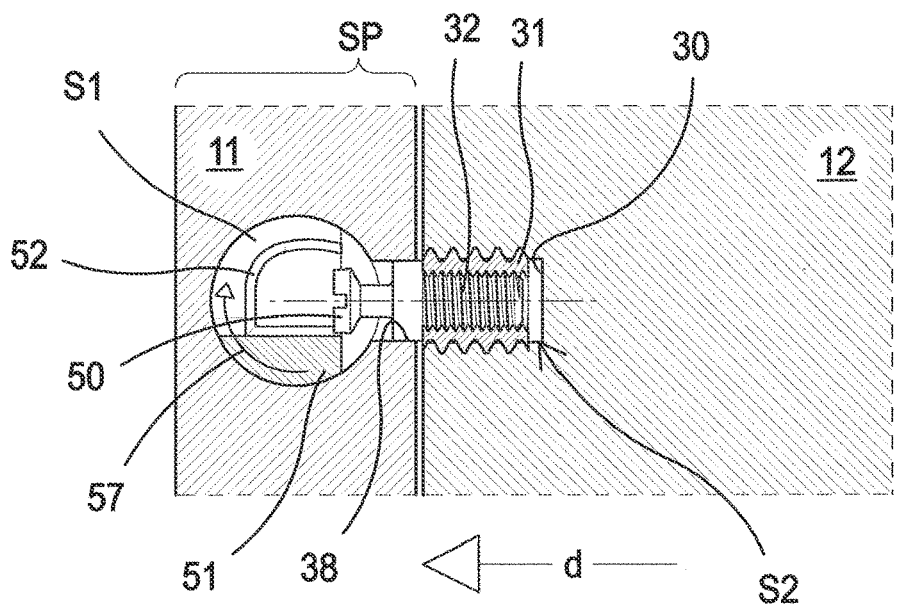

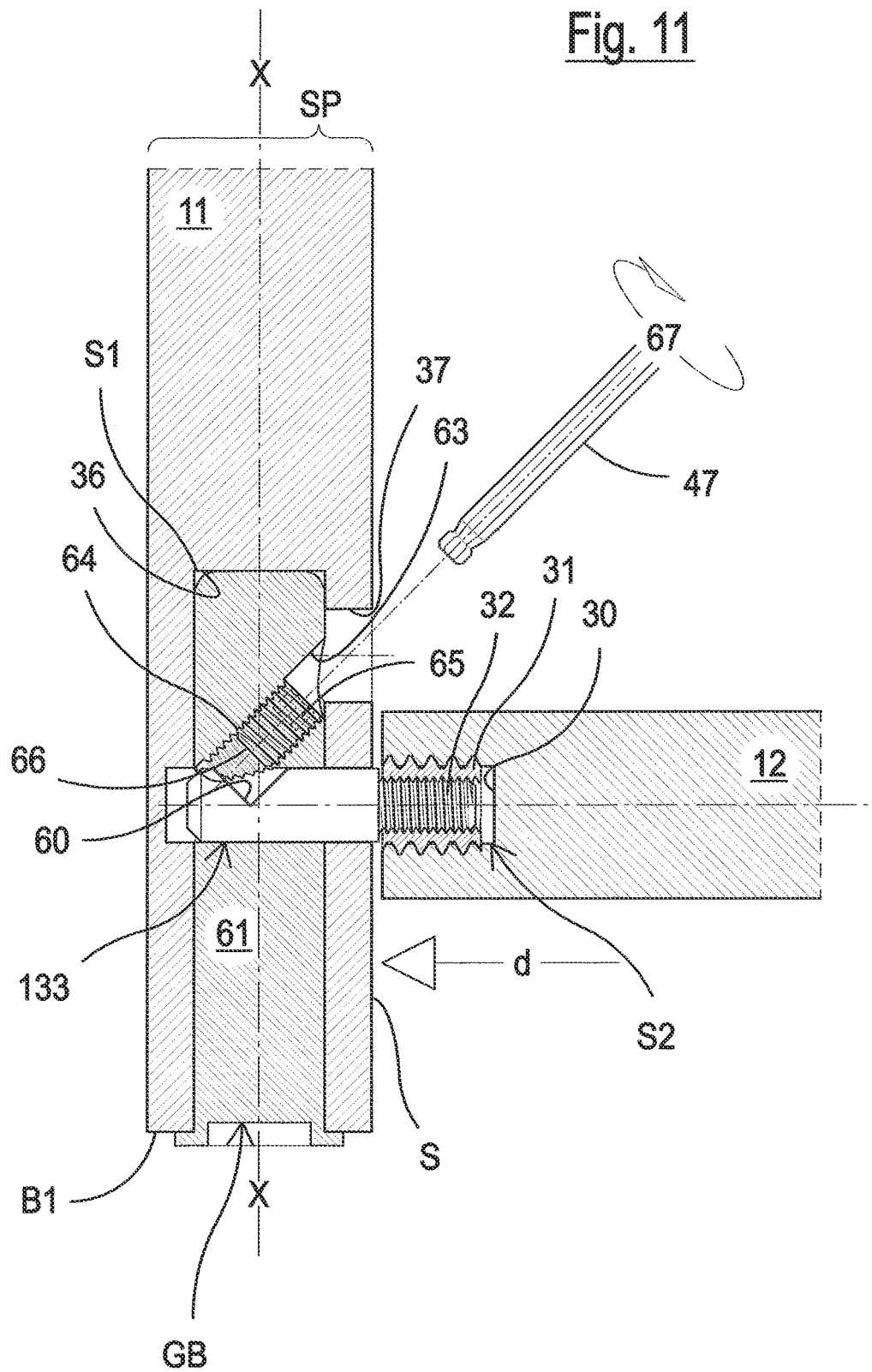

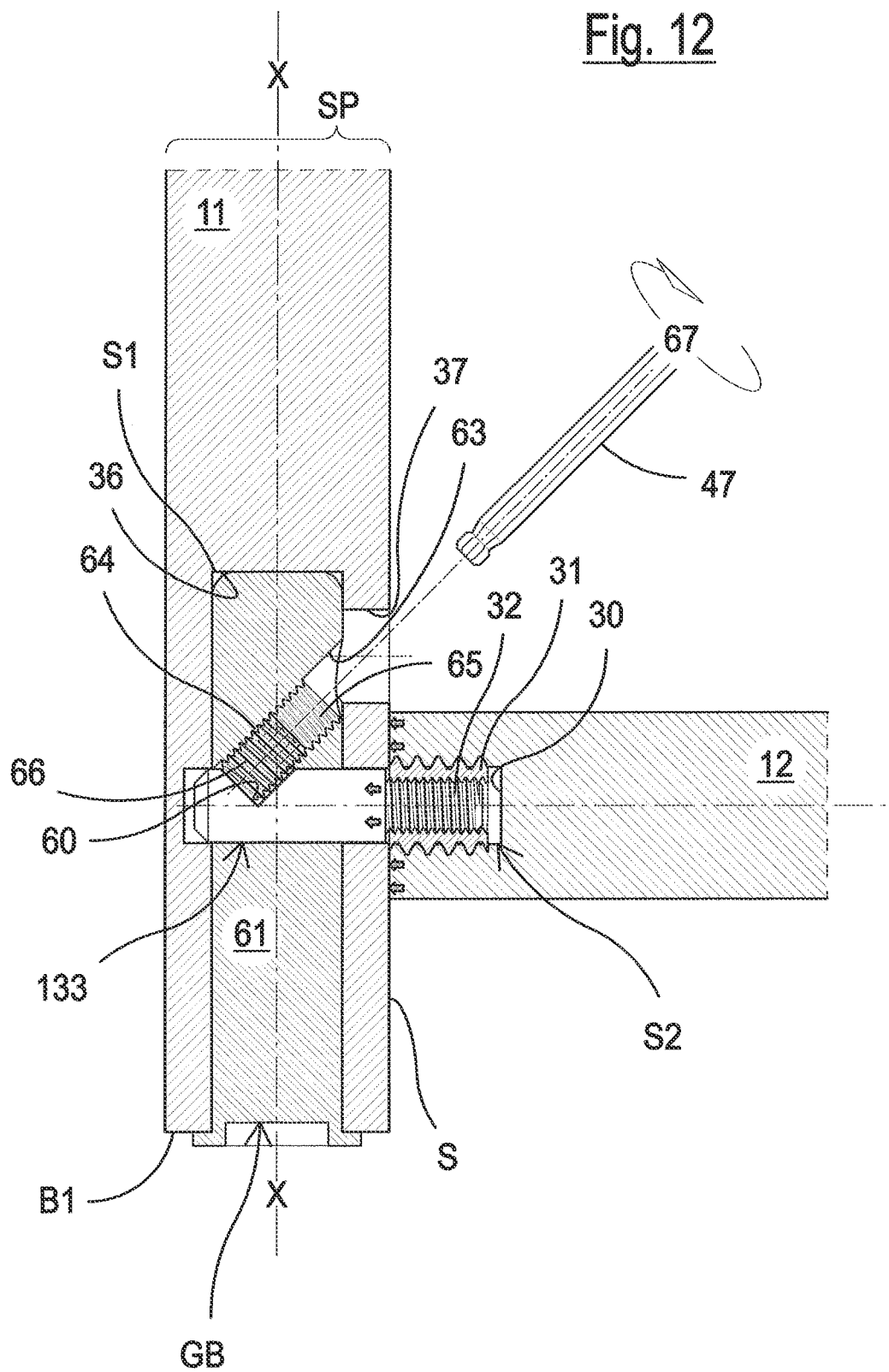

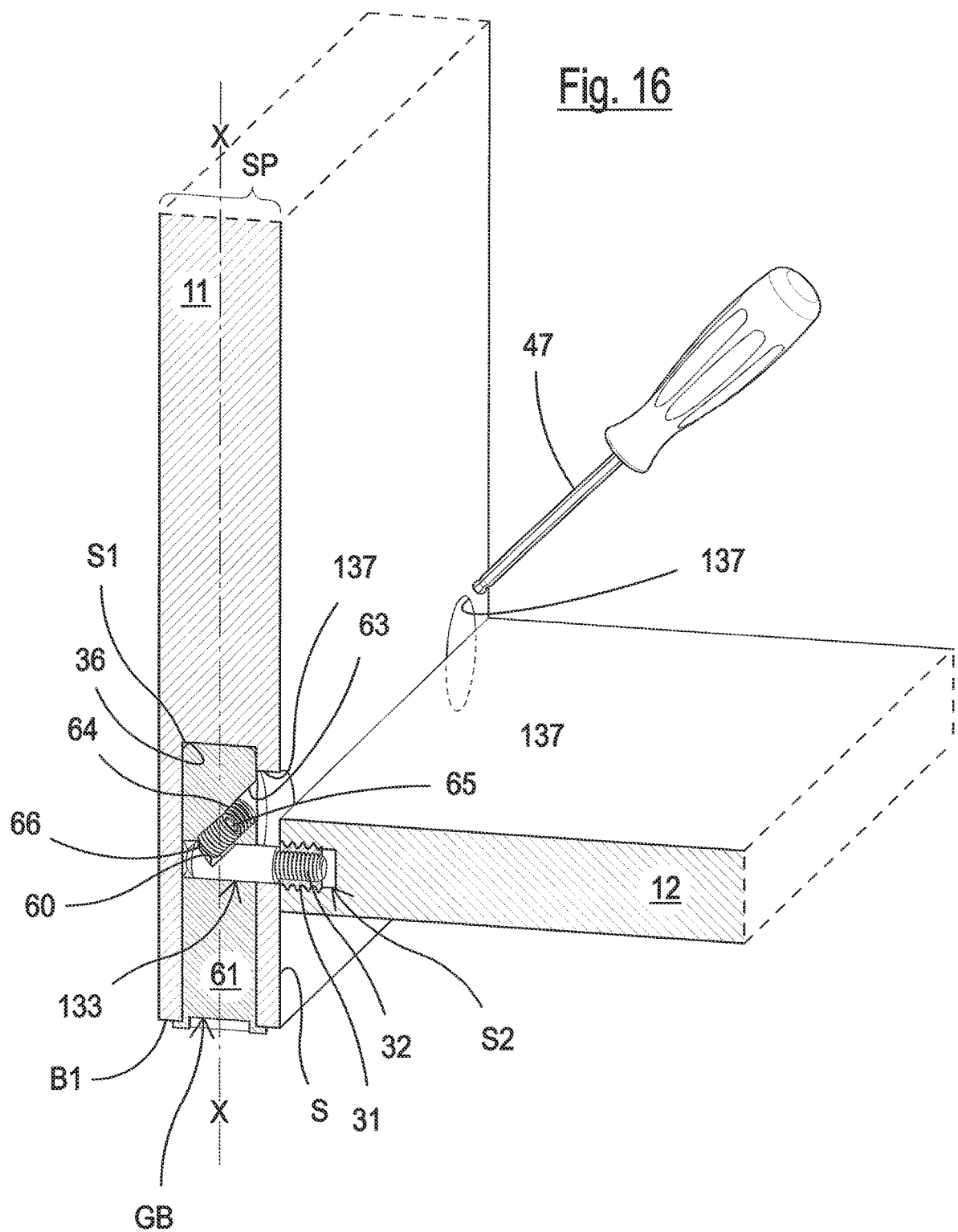

JOINING DEVICE WITH MINIMUM VISIBILITY FOR PARTS OF FURNITURE AND FURNISHING ITEMS

FIELD OF THE INVENTION

The present invention relates to a joining device with minimum visibility for parts of furniture and furnishing items.

BACKGROUND OF THE INVENTION

The joining between two panels, for example between a shoulder of a piece of furniture and a base, or in any case a shelf, is currently effected in the furniture and furnishing field using various procedures and with different solutions.

Examples of these solutions are known for example from U.S. Pat. Nos. 7,494,297, 5,567,081, 6,547,477 and 4,408,923.

These known solutions have a certain complexity and in any case have a certain visibility, as they require closing elements of the seats or holes necessary for positioning the elements that effect the joining.

Much more simply, FIGS. 1, 2 and 3 show a known solution of a joining device for parts of furniture and furnishing items, for example between a shoulder of a piece of furniture and a base, or in any case a shelf.

In the known solution illustrated, holes must be provided in both a shoulder 11 and a base 12 of a piece of furniture, both partially shown in a connection part of the same. The shoulder 11, in fact, provides a blind horizontal hole 13 and the base 12 provides even double hole 14, 15. More specifically, a horizontal hole 14 to be aligned with the hole 13 of the shoulder 11, and a vertical hole 15, formed in the upper surface of the base 12, which intersects the first hole 14, for the insertion of a blocking element, for example a bead 16, wherein both holes are blind.

Said hole 13 has an axis A which is perpendicular to the shoulder 11.

This known joining device provides the positioning of a pin 17 with a first threaded end 18 inside an internally threaded bush 19 positioned in the hole 13 of the shoulder 11. The pin 17 contains, at the other end 20, a housing 21 for an end of the bead 16.

A bush 22 is housed in the vertical hole 15 of the base 12, which provides a horizontal pass-through hole 23 for receiving the protruding end 20 of the pin 17 and a vertical threaded pass-through hole 24 which receives the bead 16.

By thus positioning said elements forming the known joining device and juxtaposing the shoulder and the base according to the arrow F of FIG. 1, the coupling of FIG. 2 is obtained, with the pin 17 inserted in the hole 14 of the base 12 and in the bush 22.

The bead 16 is then screwed, with a tool 25, according to the arrow 26, into the bush 22 so that the tip of the bead 16 is positioned in the housing 21 provided at the free end 20 of the pin 17.

The tightening of the bead 16 pushes the base 12 against the shoulder 11 creating the final stable position shown in FIG. 3.

In this known solution, the blocking group is in the base, it is arranged perpendicular to the base and to the movement or approach direction and tightening between the shoulder and base.

Only the pin, with which the blocking group cooperates, is provided in the thickness of the shoulder or side panel.

Said FIG. 3 indicates, by means of a series of arrows, the scheme of forces at play between the shoulder 11 and base 12 of the piece of furniture and between the parts of the joining device.

This final position also shows how the end of the hole 15 is present on the upper surface of the base 12, which is normally covered with a closing cap (not shown).

Said hole and the corresponding cap form a visible part of the joining device.

First of all, this part does not have an aesthetically valid appearance as, although there is the presence of the cap, it shows how the joint has been produced. Furthermore, the cap itself, which is difficult to be brought specifically in line with the surface of the base, represents an obstacle for the insertion of any object, creating a protrusion, even if minimum, with respect to the upper surface of the base.

The presence of at least two holes in the base, moreover, intersecting each other, causes a weakening of the base itself that must sustain loads representing a possible cause of breakage.

DE 27 01 871 discloses a joining device for parts of furniture created by means of a pin, provided with a slotted hole, partially inserted in a panel, which is connected to a second panel, in which a blind hole is formed and in which a screw with a conical head is inserted, forming the coupling between the two panels and their blockage.

SUMMARY OF THE INVENTION

The general objective of the present invention is to provide a joining device between parts of furniture and furnishing items, such as a shoulder and a base, capable of solving the drawbacks of the known art indicated above, in an extremely simple, economical and particularly functional manner.

A further objective of the present invention is to provide a joining device between parts of furniture and furnishing items, such as a shoulder and a base, that is not visible to an observer, consequently having a high aesthetical value.

Yet another objective of the present invention is to provide a joining device between parts of furniture and furnishing items, such as a shoulder and a base, that does not have any protrusion with respect to the upper surface of the base.

BRIEF DESCRIPTION OF THE DRAWINGS

The structural and functional characteristics of the present invention and its advantages with respect to the known art will appear more evident from the following description, referring to the enclosed schematic drawings which show embodiment examples of the same invention. In the drawings:

FIGS. 2 and 3 are two sectional views of the known device of FIG. 1, wherein FIG. 2 shows said parts juxtaposed with respect to each other and partially inserted in each other and FIG. 3 shows said parts completely inserted in each other and tightened;

FIGS. 8a and 8b are a raised sectional view and a sectional view from above according to the line VIIIb-VIIIb of FIG. 8a of the device of FIGS. 7a and 7b with said parts juxtaposed with respect to each other and partially inserted in each other;

FIG. 11 is a sectional view of the device of FIG. 10 with said parts juxtaposed with respect to each other and partially inserted in each other;

FIG. 12 is a sectional view of the device of FIG. 10 with said parts completely inserted in each other and tightened;

FIG. 16 is a perspective, partly sectional, view illustrating the joining device of FIGS. 13-15 as it appears from above.

DETAILED DESCRIPTION OF EMBODIMENTS OF THE INVENTION

Figure 1:
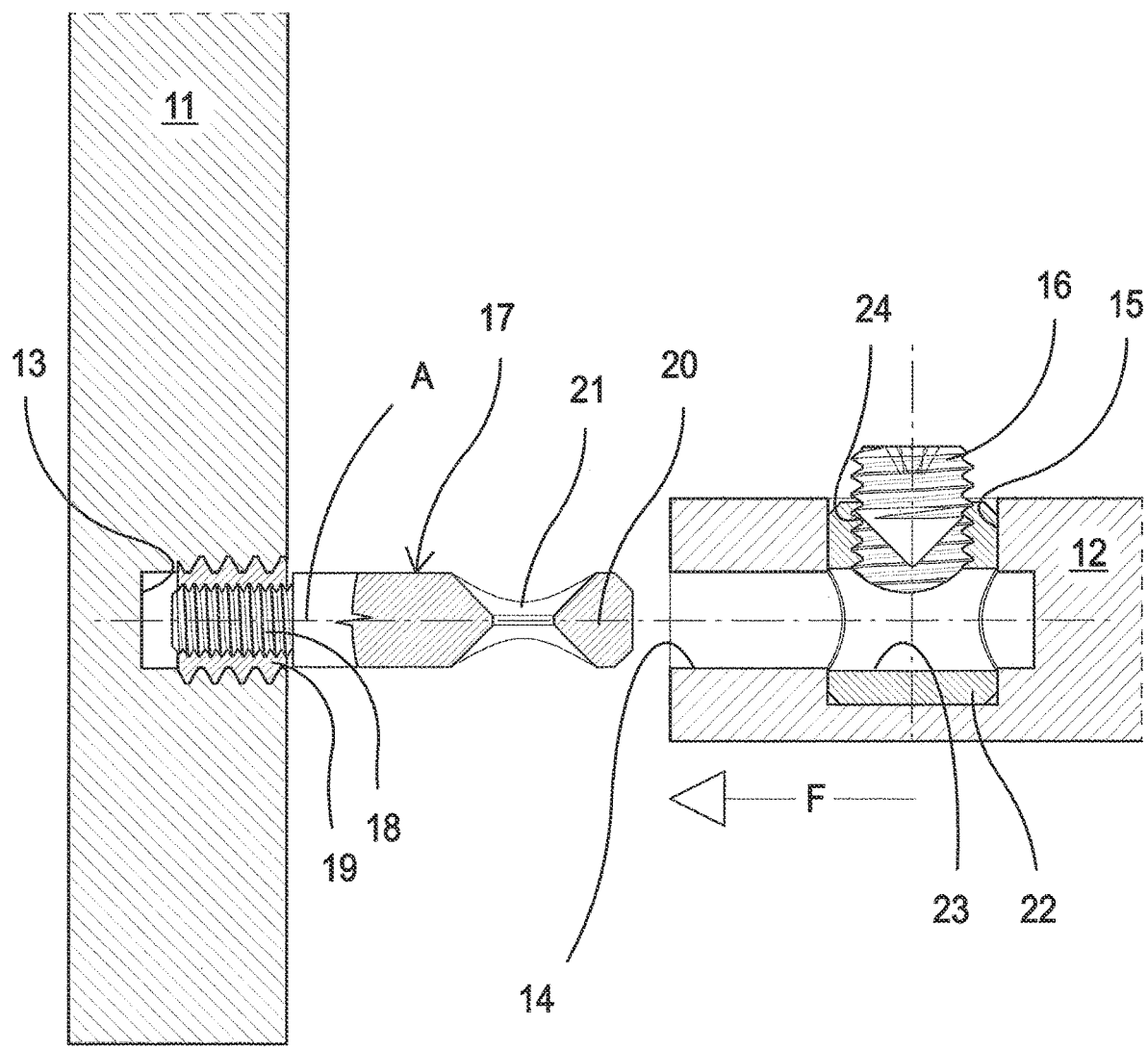
FIG. 1 is a sectional view illustrating parts, spaced from each other, of a known joining device for parts of furniture and furnishing items, for example between a shoulder of a piece of furniture and a base or in any case a shelf.
Figure 2:
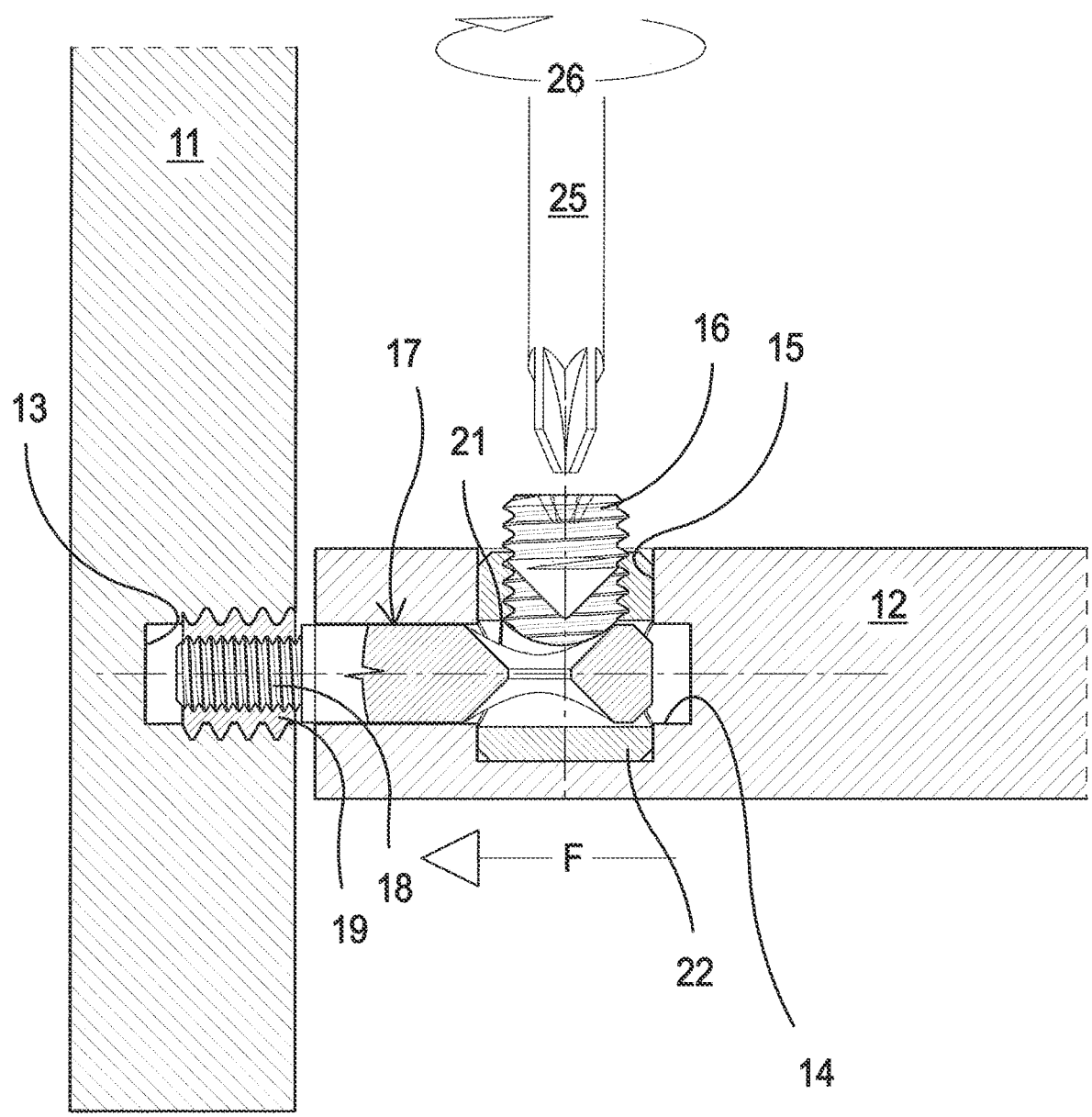
Figure 3:
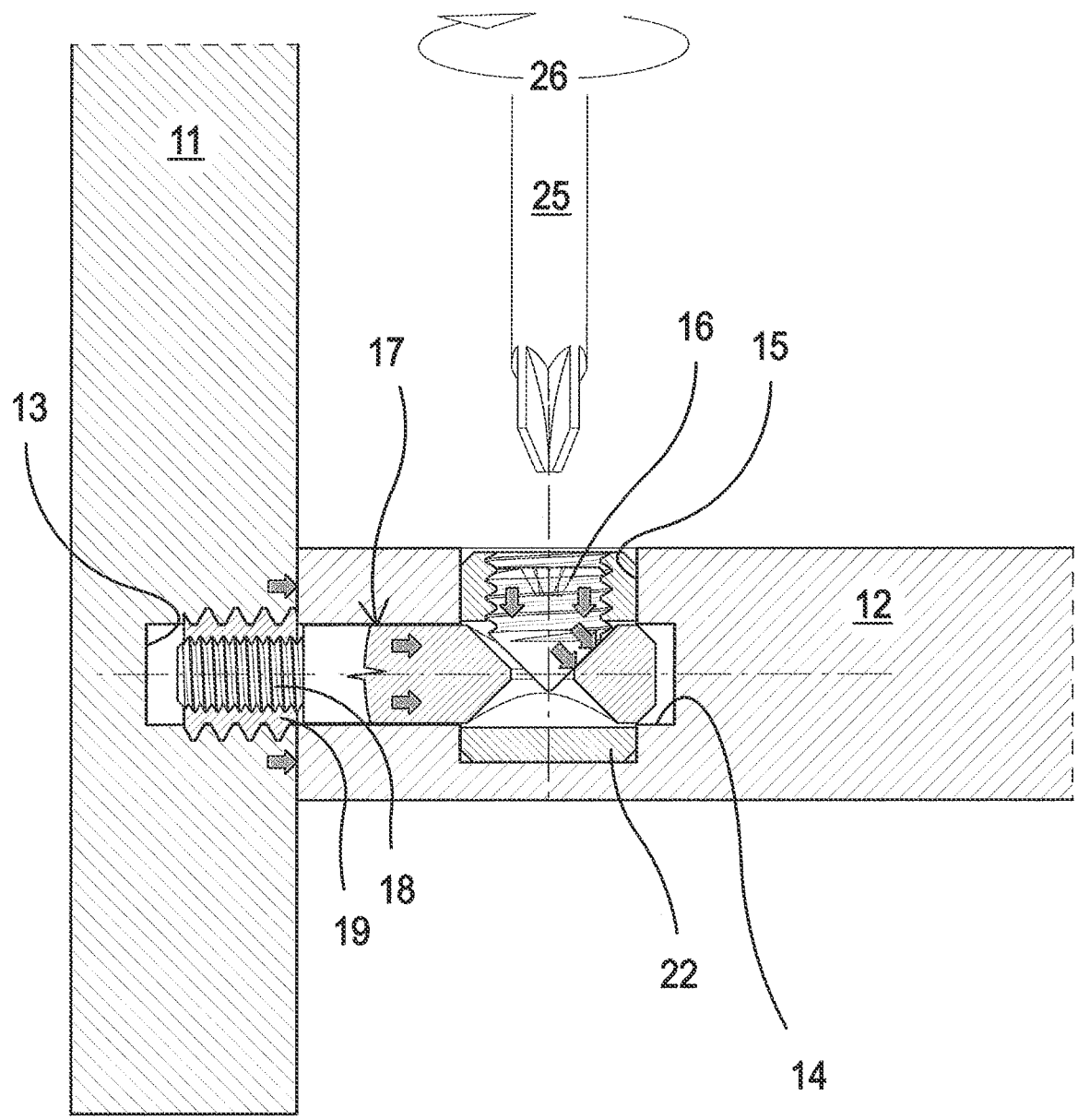
Figure 4:
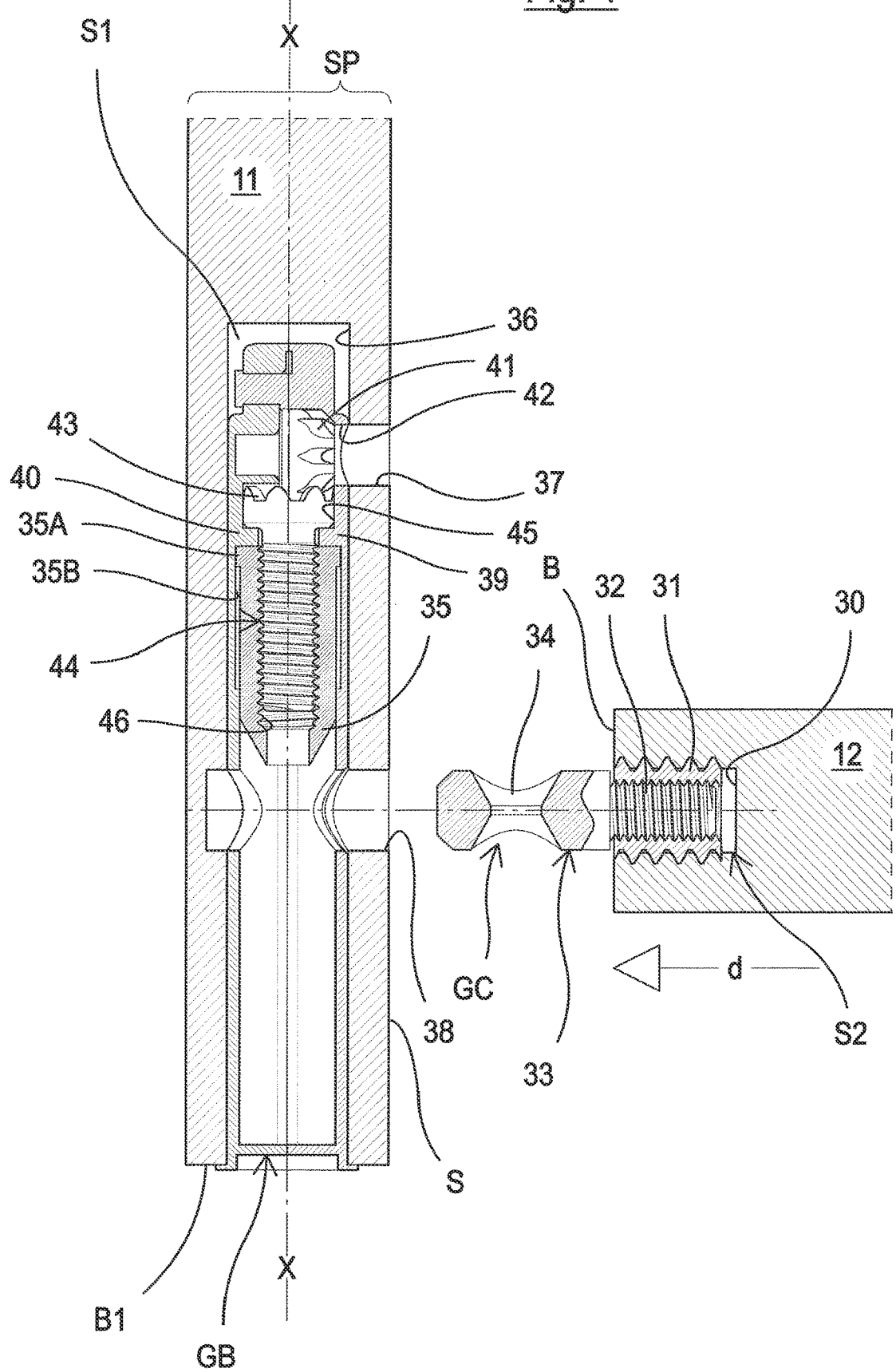
FIG. 4 is a sectional view illustrating parts, spaced from each other, of a joining device for parts of furniture and furnishing items, for example between a shoulder of a piece of furniture and a base or in any case a shelf, in a first embodiment with said parts spaced from each other.
Figure 5:
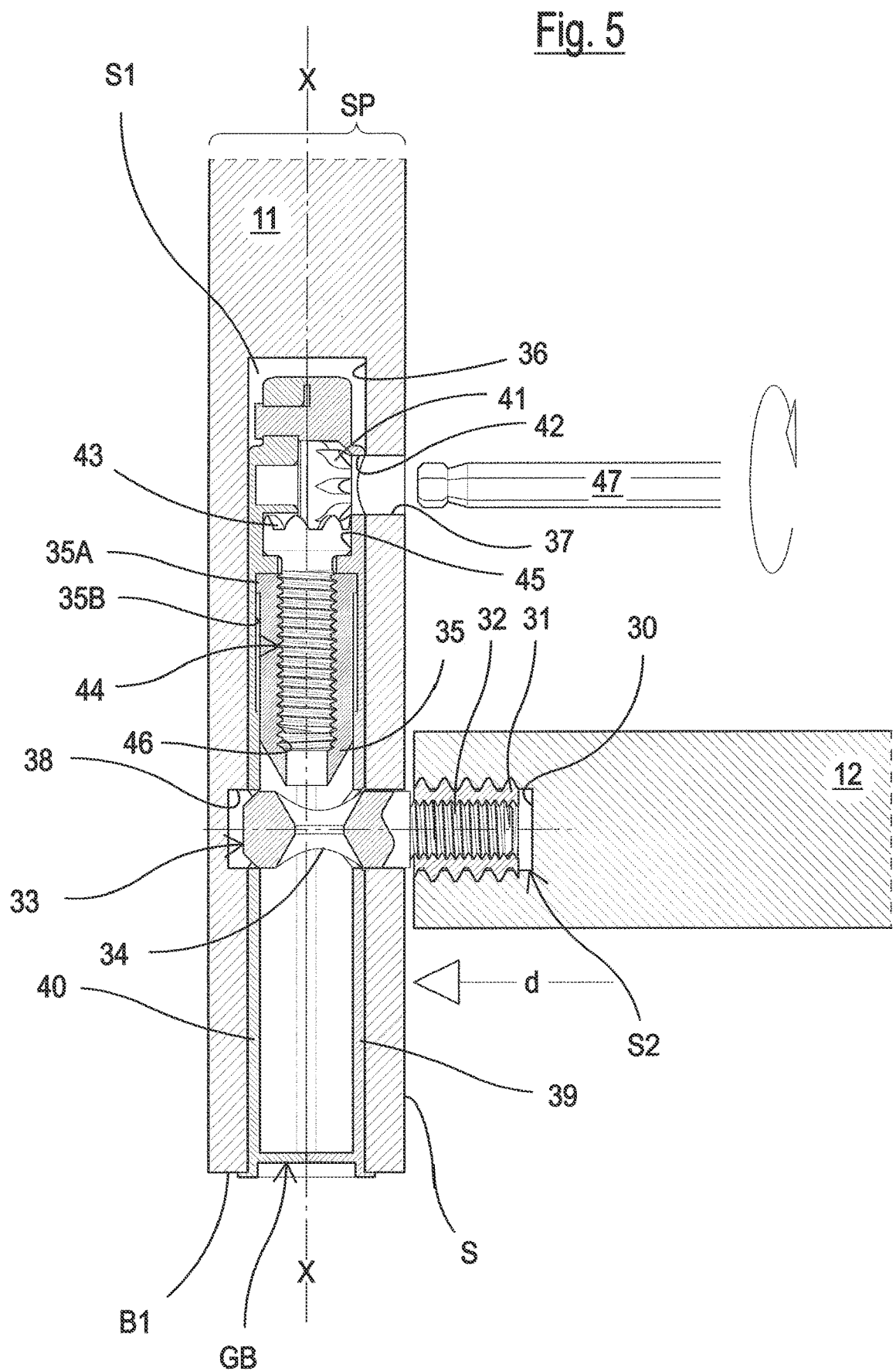
FIG. 5 is a sectional view of the device of FIG. 4 with said parts juxtaposed and partially inserted in each other.
Figure 6:
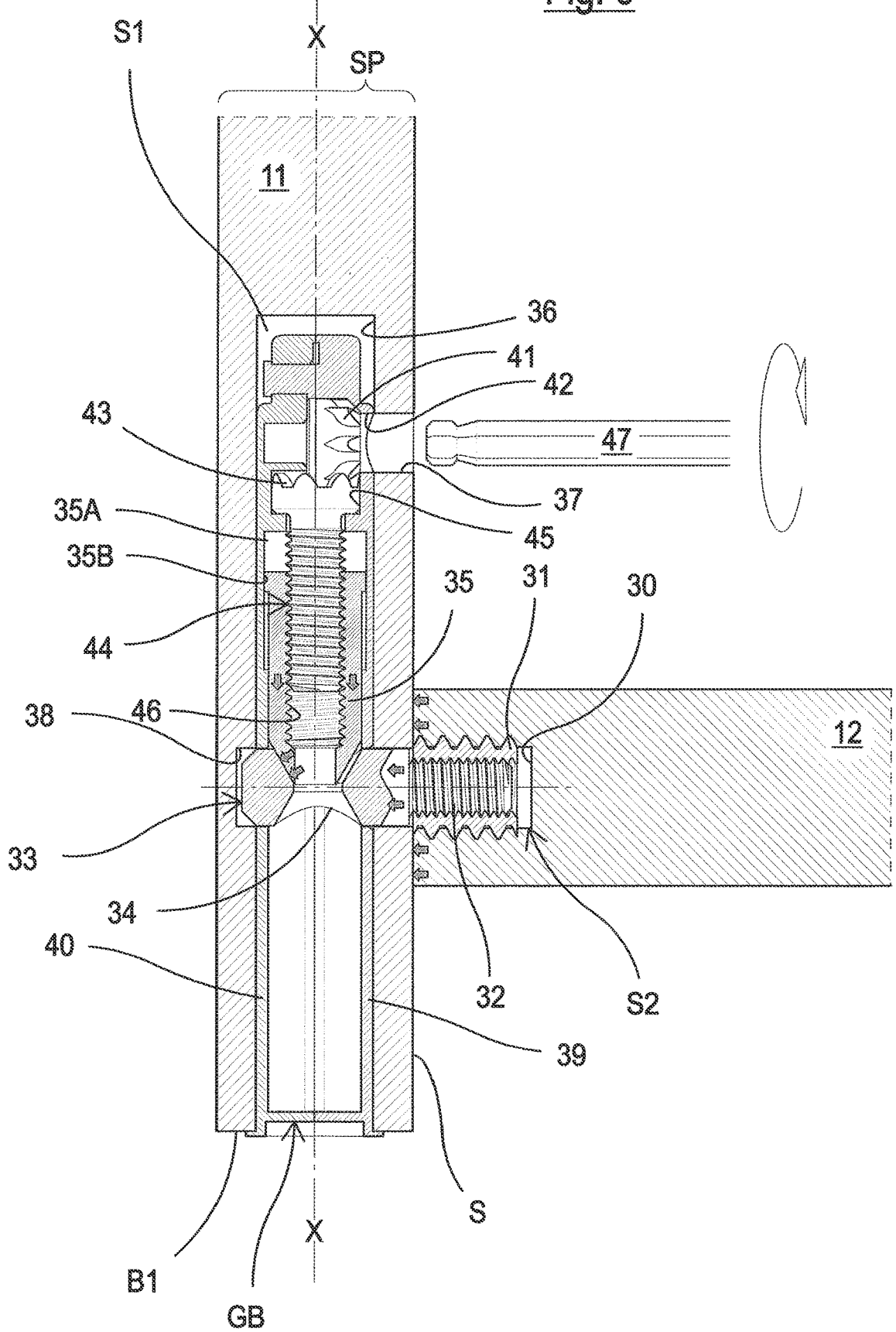
FIG. 6 is a sectional view of the device of FIG. 4 with said parts completely inserted in each other and tightened.

With reference first of all to FIGS. 4, 5 and 6, these show a first embodiment of a joining device for parts of furniture and furnishing items according to the invention. In the example, the joining device must connect and join a first panel 11, for example a shoulder 11 of a piece of furniture and a second panel 12, for example a base 12, or in any case a panel or shelf, partially shown in the figures. As illustrated in the examples, the shoulder 11 and the base or panel 12 are generally perpendicular to each other but they may also be tilted with respect to each other.

The base 12 contains, at one of its ends, a seat S2 in the form of a horizontal blind hole 30 in which an internally threaded bush 31 is positioned for receiving a threaded end 32 of a pin 33.

In its protruding part, the pin 33 provides a housing 34 for the tip of a blocking bead 35.

Said pin 33 defines a connection group GC to be firmly blocked for stably interconnecting said shoulder 11 and said base 12, as explained in greater detail hereunder. In this way, at least part of the connection group GC is assembled in the panel 12 before the final coupling of the two panels 11, 12 against each other.

The shoulder 11 provides a seat S1—for a blocking group GB—having a substantially elongated configuration, in the form of a vertical blind hole 36 which intersects with a first and a second horizontal blind hole 37, 38, spaced from each other.

Said seat S1, characteristically extends from a perimetric edge B1 towards the inside of said shoulder or panel 11.

The blocking group GB is inserted inside the seat S1 before the final coupling of the two panels 11, 12 against each other.

A pair of half-shells 39, 40, are in fact housed in the vertical hole 36, that form a cylindrical casing inside part of which the bead 35 is caused to slide by means of a pinion-toothed crown bevel pair. A pinion 41 is in fact rotatingly positioned inside a hole 42 formed in one of the two half-shells 39, which is aligned with the first horizontal hole 37 of the shoulder 11. The pinion 41 is engaged with a toothed crown 43, formed as head of a threaded screw 44, and can rotate in a seat 45 produced in the two coupled half-shells 39 and 40. The threaded screw 44 is in turn positioned in a threaded axial hole 46 and inside the bead 35.

Said components 34,41,43,46 define a blocking group GB suitable for acting on the above-mentioned connection group GC composed of the pin 33, as explained in greater detail hereunder.

A shaped tool 47, such as a hexagonal key, is suitable for being inserted in a complementary seat of the pinion 41 passing through the first hole 37 of the shoulder 11 thus coupling with it to cause its rotation.

The rotation of the pinion 41 in turn causes the rotation of the toothed crown 43 of the head of the threaded screw 44. The rotation of the threaded screw 44 forces the downward movement of the bead 35.

It can thus be seen how, in this first embodiment, the joining device of the present invention essentially comprises a blocking group GB (35, 41, 43, 44, 46) inserted inside a seat S1 in the form of an elongated vertical hole 36 of the shoulder 11, which acts on a pin connection group GC 33 to be blocked, positioned inside a seat S2 of the base 12 and which extends from a horizontal hole 30 formed at the side of the base 12 itself. More generally, regardless of what is shown in this first example, it is provided, according to the invention, that the blocking group GB be inserted inside a seat S1 completely contained in the thickness SP of the shoulder or panel as desired, wherein the longitudinal axis x of said seat S1 or hole 36 extends perpendicular to the approach direction d and tightening of the base to the shoulder or panel.

As can be clearly seen in the drawings, said blocking group GB is inserted inside said seat S1 which is contained in the thickness SP of the shoulder 11 on which the blocking group GB is applied, wherein the seat S1 extends from the edge B1 towards the inside of the shoulder 11 according to an axis X which is perpendicular to the above-mentioned direction d.

Returning to the example, the two parts of the joining device according to the present invention are first positioned, by placing the two half-shells 39 and 40 in the hole 36 of the shoulder 11 and the pin 33 in the hole 30 of the base 12, as shown in FIG. 4.

The edge B of the base 12 is moved towards the surface S of the shoulder 11, inserting the protruding part of the pin 33 into the second horizontal hole 38 of the shoulder 11.

The tool 47, in the example a hexagonal key, is then inserted into the complementary seat of the pinion 41, passing through the first hole 37 of the shoulder 11 so as to cause the rotation of the pinion 41. The rotation of the pinion 41 causes the rotation of the toothed crown 43 of the head of the threaded screw 44 which forces the downward movement of the bead 35; for this purpose, the bead 35 is provided with blocking means 35A, 35B against rotation (anti-rotational form), which allow the translation of the bead 35 itself, preventing its rotation. The means 35A can consist, for example, of radial protrusions which are coupled inside corresponding seats 35B of the half-shells 39, 40.

The tip of the bead 35 is engaged in the housing 34 of the pin, causing the tightening between the shoulder 11 and the base 12, as shown in FIG. 6, by moving the base 12 in the direction d which is perpendicular to the longitudinal axis x of the seat S1 or hole 36. FIG. 6 indicates, by means of a series of arrows, the scheme of the forces at play between the shoulder 11 and the base 12 of the piece of furniture and between the parts of this embodiment of the joining device.

Figure 7A:
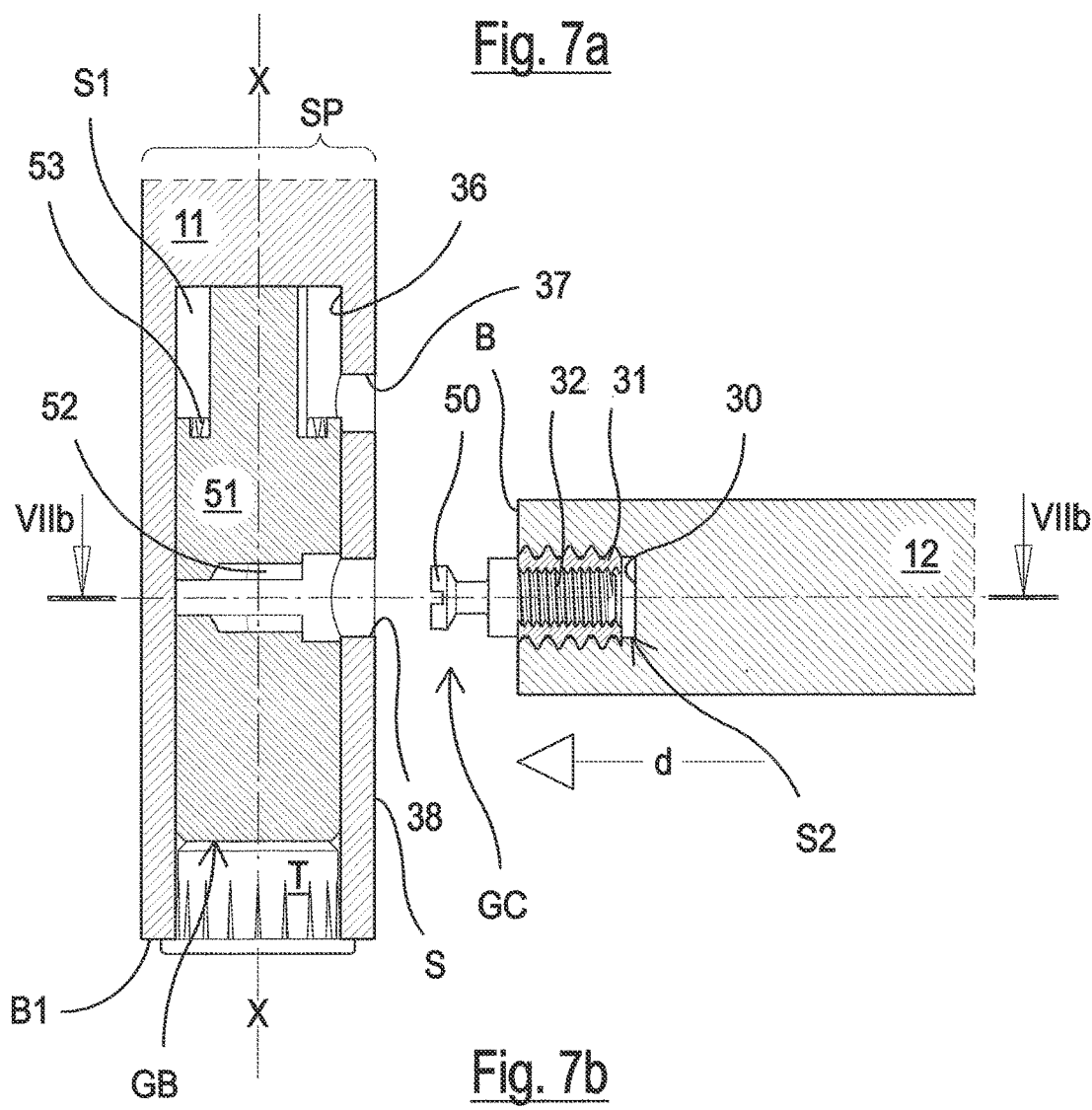
FIGS. 7a and 7b are a raised sectional view and a sectional view from above according to the line VIIb-VIIb of FIG. 7a illustrating parts spaced from each other, of a joining device for parts of furniture and furnishing items, for example between a shoulder of a piece of furniture and a base or in any case a shelf, according to the invention, in a second embodiment with said parts spaced from each other.
Figure 7B:
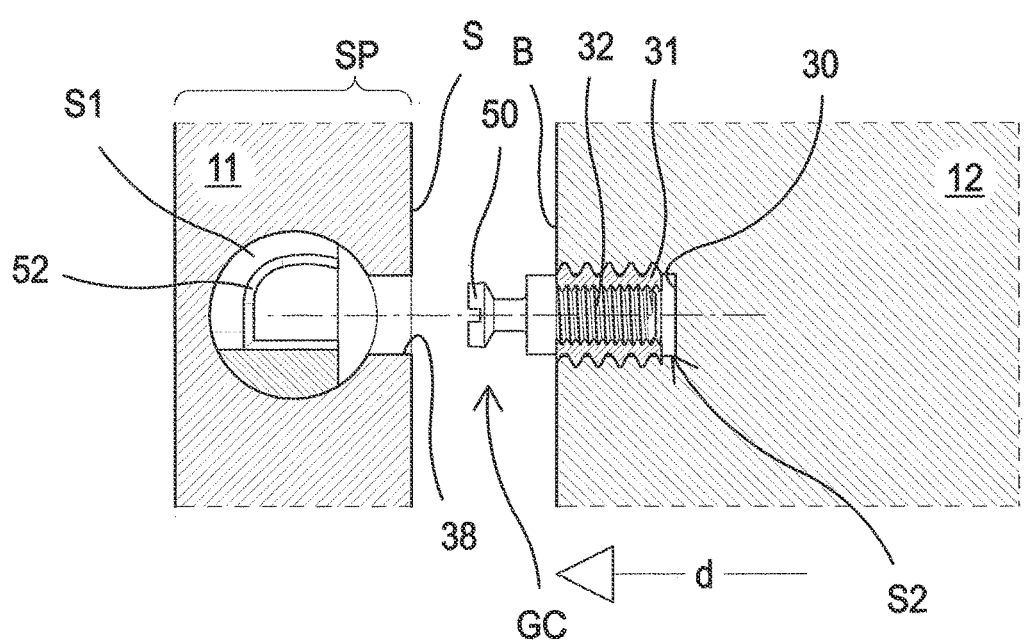
Figure 9A:
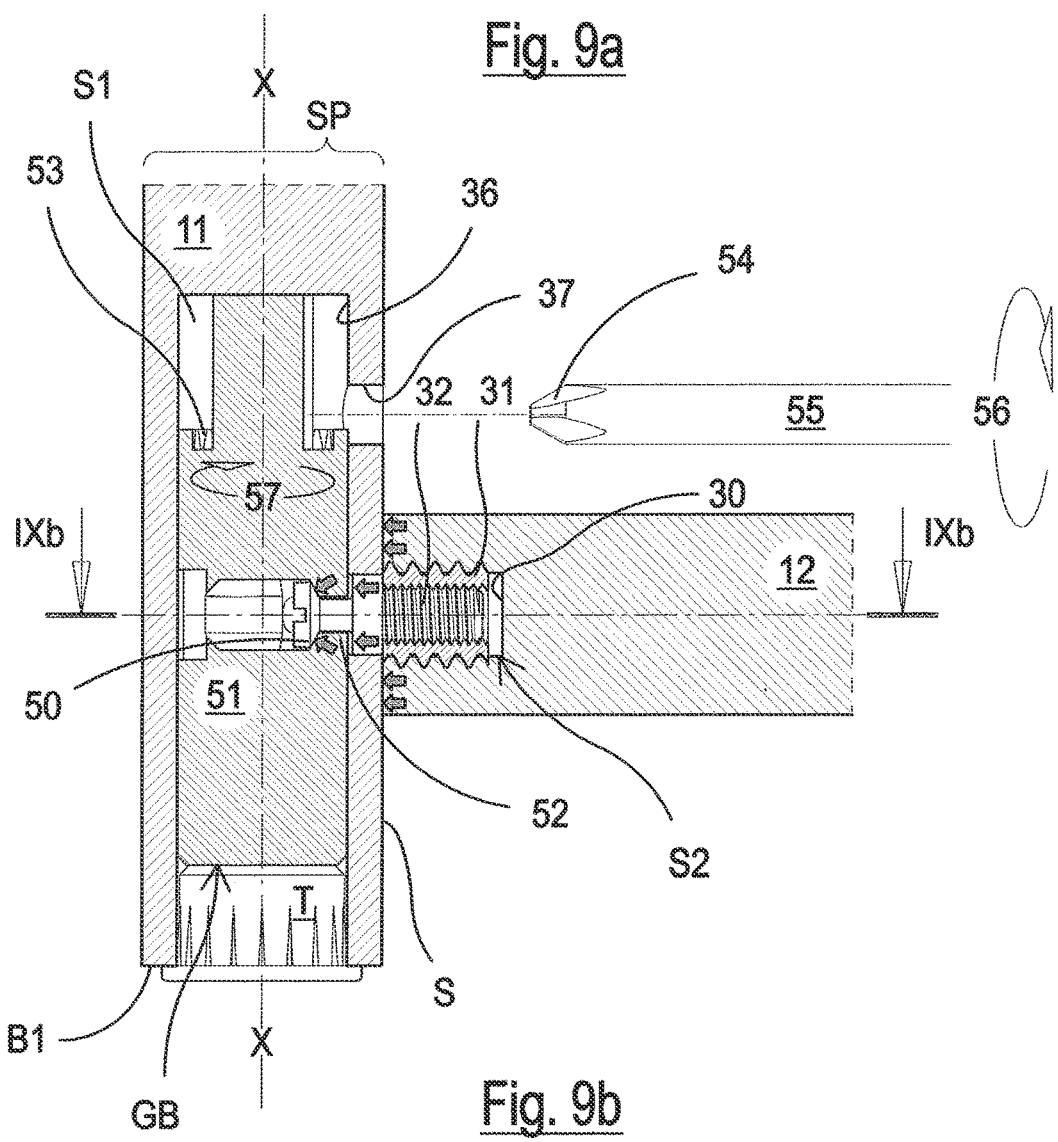
FIGS. 9a and 9b are a raised sectional view and a sectional view from above according to the line IXb-IXb of FIG. 9a of the device of FIGS. 7a and 7b with said parts completely inserted in each other and tightened.
Figure 9B:
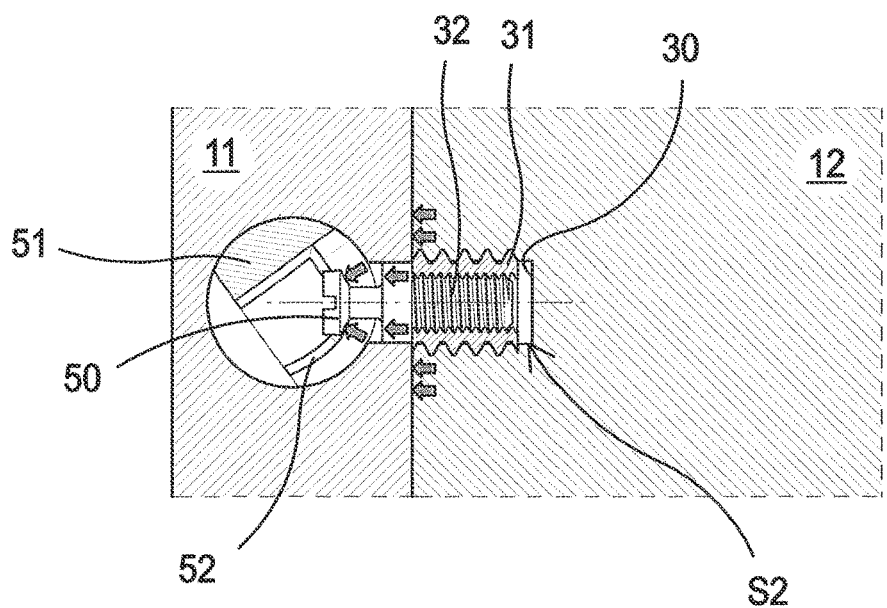

FIGS. 7a and 9b are a raised sectional view and a sectional view from above of a joining device of the invention in a second embodiment.

Whereas in the first embodiment, a bevel gear was used, in this second embodiment, the joining is obtained by means of a cam for blocking the shoulder 11 and base 12 of a piece of furniture, partially shown.

The base 12 comprises a seat S2 in the form of a horizontal blind hole 30 in which an internally threaded bush 31 is block-positioned for receiving a threaded end 32 of a screw having an enlarged head 50, in the example, flared.

The shoulder 11 comprises a seat S1 in the form of a vertical blind hole 36 which intersects with a first and a second horizontal blind hole 37, 38, spaced from each other.

A cylinder 51 is housed in the vertical hole 36, which rotates in the vertical hole 36. The cylinder 51 provides, in an intermediate portion, a cam 52 suitable for being engaged with the screw having an enlarged head 50 positioned integral with the bush 31 of the base 12. The cam 52, which is rotatable, is produced in the form of a curved wall which forms a toothing which extends upwards, having a variable profile (FIG. 9b).

An upper portion of the cylinder 51 contains a perimetric toothing 53, embedded with respect to the side surface of the cylinder 51, that can be engaged by means of a star tip 54 of a screwdriver 55 (only partially shown). Said toothing 53 forms activation means for the rotation of the cam 52.

Also in this second embodiment, the joining device of the present invention essentially comprises a blocking group GB (51, 52, 53) positioned in a seat S1 in the form of a vertical hole 36 of the shoulder 11 which acts on a pin connection group GC 50 to be blocked, positioned inside a seat S2 of the base 12 and which extends from a horizontal hole 30 produced at the side of the base 12.

Once the screw with an enlarged head 50 has been positioned in the base 12 and the cylinder 51 in the shoulder 11, the following procedure is effected for joining the parts.

Said screw with an enlarged head 50 is first inserted in the second horizontal hole 38 of the shoulder 11, as shown in FIGS. 8a and 8b. In this way, the screw with an enlarged head 50 is brought in correspondence with the cam 52.

At this point, by inserting the star tip 54 of the screwdriver 55 in the first hole 37 of the shoulder 11, it becomes engaged on the perimetric toothing 53 of the cylinder 51 and the screwdriver is rotated according to the arrow 56 causing the rotation of the cylinder 51 according to the arrow 57. This rotation also causes the rotation of the toothing of the cam 52 which is inserted under the flare of the screw with an enlarged head 50, tightening the parts, as shown in FIG. 9a, by moving the base 12 in the direction d which is perpendicular to the axis x of the seat S1 or hole 36. This figure also indicates, by a series of arrows, the positioning of the forces at play between the shoulder 11 and base 12 of the piece of furniture and between the parts of the joining device.

According to the invention, the blocking group is inserted in a seat or hole formed or completely contained in the thickness SP of the shoulder or panel 11, wherein the axis x of the seat S1 or hole 36 is perpendicular to the direction d.

Figure 10:
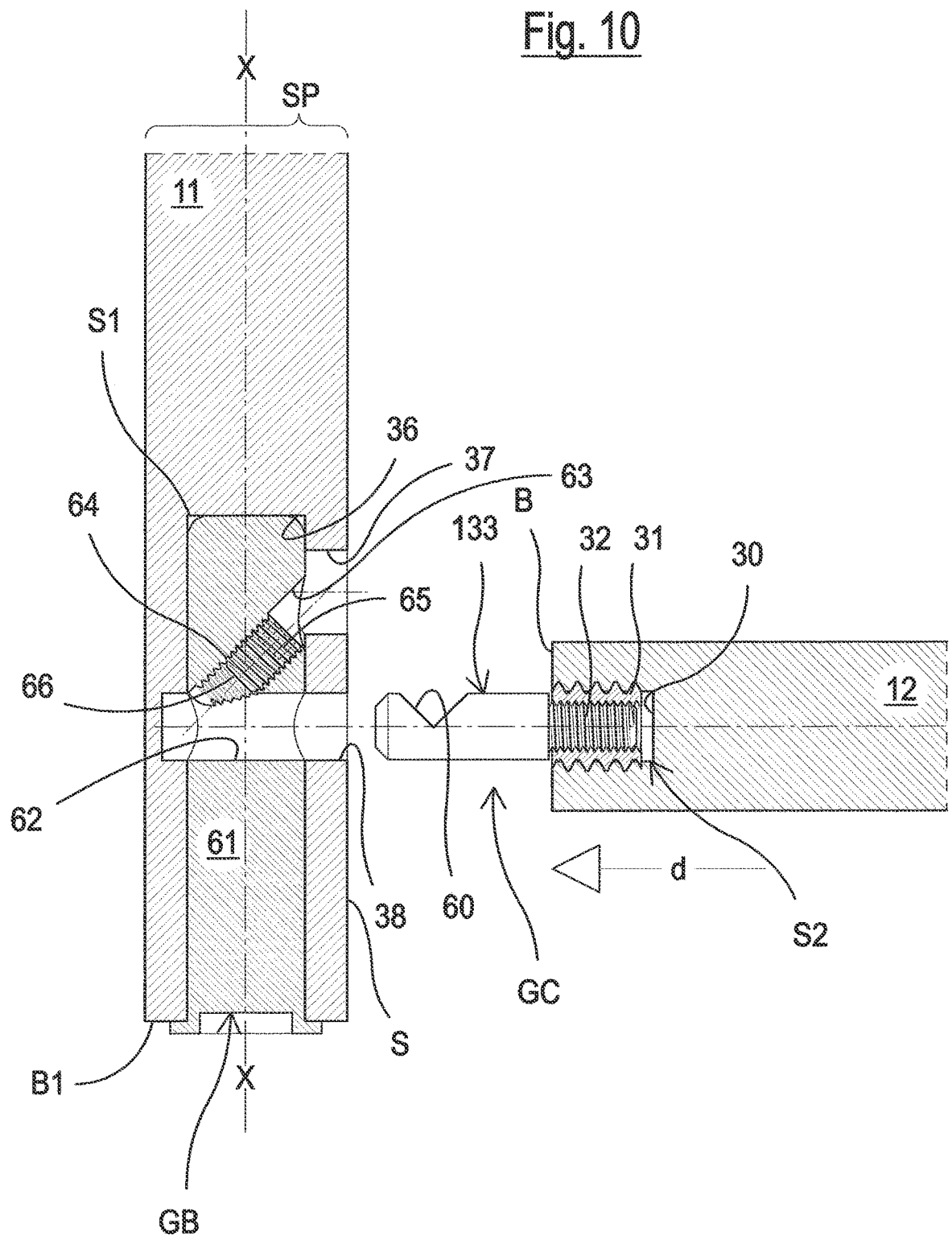
FIG. 10 is a sectional view illustrating parts spaced from each other, of a joining device for parts of furniture and furnishing items, for example between a shoulder of a piece of furniture and a base or in any case a shelf, according to the invention, in a third embodiment with said parts spaced from each other.

FIGS. 10, 11 and 12 show a sectional view of the positioning of the parts of a joining device between a shoulder of a piece of furniture and a base according to the invention in a further embodiment.

As for the other embodiments of the invention, said joining device must form a stable coupling between a base 12 and a shoulder 11, partially shown and forming part of a piece of furniture.

The base 12 contains, at one of its side ends, a seat S2 in the form of a horizontal blind hole 30 in which an internally threaded bush 31 is positioned, suitable for receiving a threaded end 32 of a pin 133. The pin 133 is, for example, cylindrically shaped and provides, in a protruding side part, a V-shaped cavity 60.

The shoulder 11 comprises a seat S1 in the form of a vertical blind hole 36 which intersects with a first and second horizontal blind hole 37, 38, spaced from each other.

A cylinder 61 is housed in the elongated vertical hole 36, in which a pass-through hole 62 is provided in an intermediate portion, which is perpendicular to the axis of the cylinder 61 and suitable for receiving the pin 133. The pass-through hole 62 is in an aligned position with respect to the second hole 38 of the shoulder 11.

An upper portion of the cylinder 61 contains a further hole 63, aligned with the first hole 37 in its initial portion towards the outside and in its further part produced in a tilted direction with respect to the axis of the cylinder 61, directed downwards towards the intermediate portion of the cylinder 61. Said hole 63 intersects the pass-through hole 62 and receives a bead 65 in its threaded portion 64, which can be activated by means of a shaped tool 47, such as a hexagonal key.

Figure 12A:
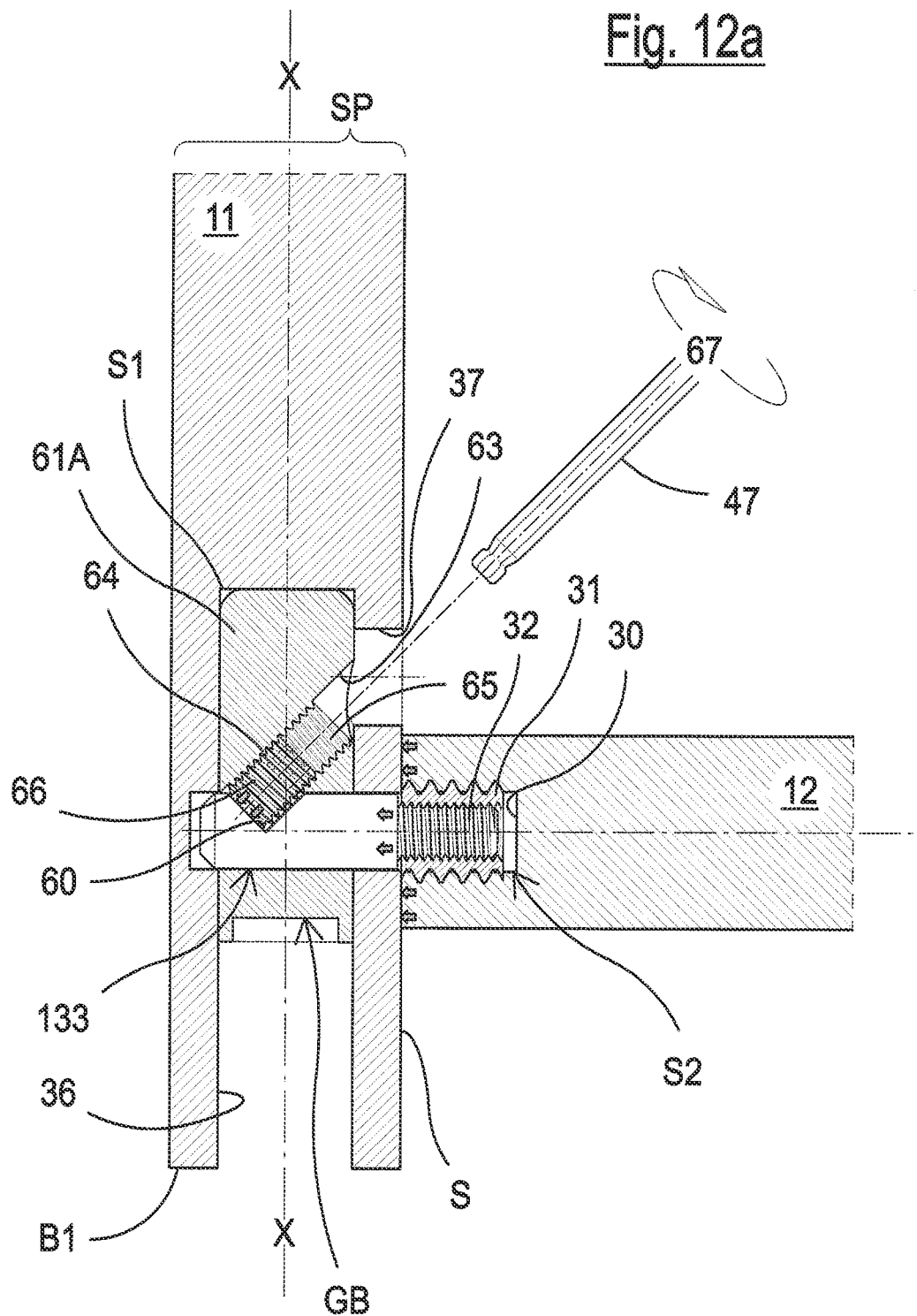
FIG. 12a is a view similar to FIG. 12 illustrating a possible variant of the joining device.
Figure 13:
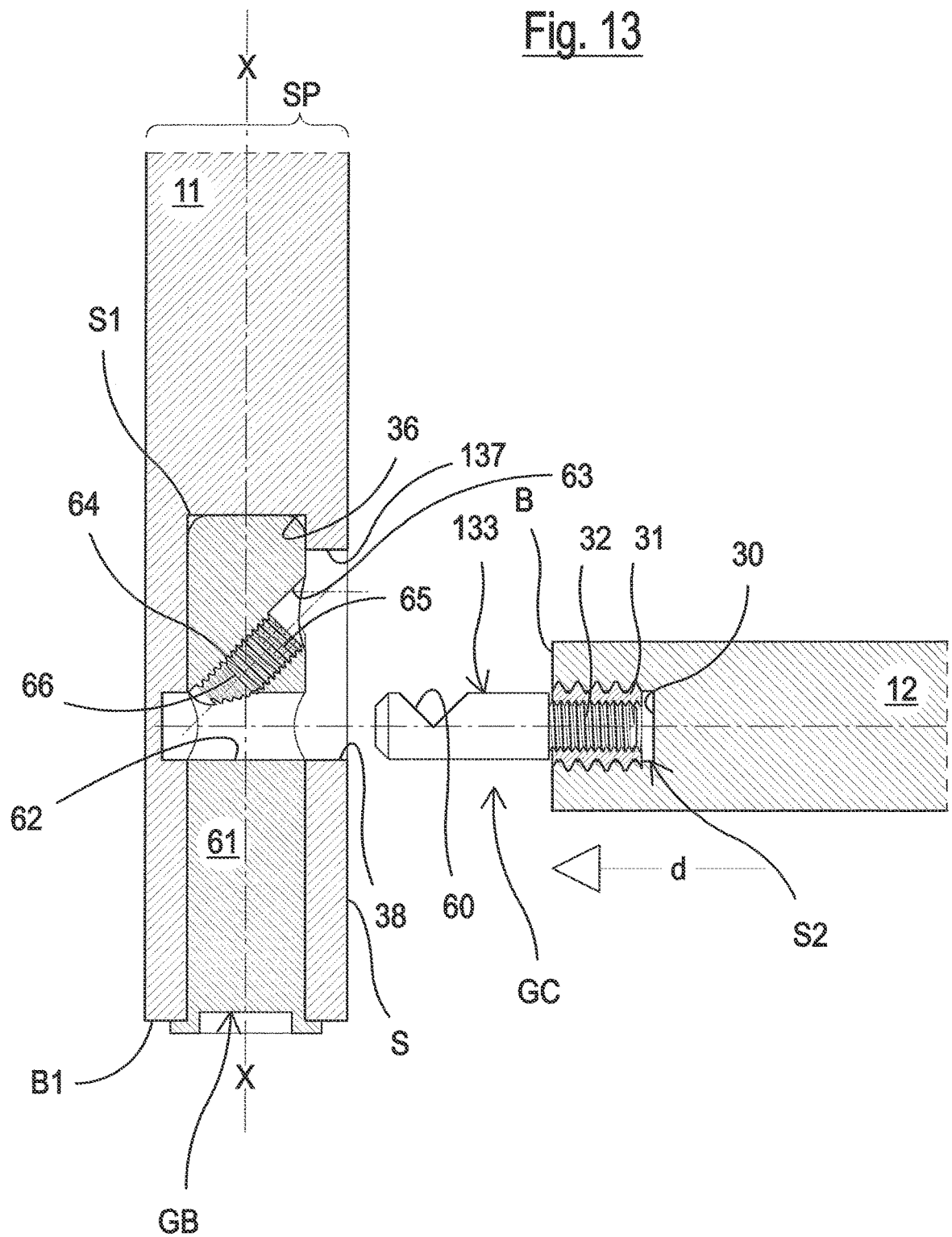
FIG. 13 is a sectional view illustrating parts spaced from each other, of a joining device for parts of furniture and furnishing items, similar to that of FIGS. 9 to 12, according to the invention, in a fourth embodiment with said parts spaced from each other.

As can be clearly seen from the drawings, in the version of FIGS. 10-13, the cylinder 61 is long and extends outside the hole 36, protruding from the edge B1, whereas the possible variant of FIG. 12a provides a short cylinder 61A, which does not protrude from said edge B1.

As can be clearly seen from the drawings, the embodiment of the joining device illustrated in FIGS. 7a-9b also provides a short cylinder 51: in this embodiment, however, the open end of the hole 36 is closed by a cap T.

Once again, the joining device of the present invention described above essentially comprises a blocking group GB (61, 63, 65) inserted inside a seat S1 or elongated vertical hole 36 of the shoulder 11 which acts on a pin connection group GC (133, 60) to be blocked, positioned inside a seat S2 of the base 12 and which extends from a horizontal hole 30 produced at the side of the base 12.

Also in this case, it can be generally asserted that, regardless of what is shown in this further example, the invention provides that the blocking group GB is inserted in a seat or hole completely produced in the thickness SP of the shoulder or panel, wherein the axis x of the hole 36 extends perpendicular to the approach direction d for tightening of the base to the shoulder or panel. More specifically, in this case, the tool is inserted in the hole of the shoulder, tilted with respect to the approach direction d and tightening between the parts.

Consequently, once the pin 133 has been positioned in the base 12 and the cylinder 61 in the shoulder 11, the following procedure is effected for joining the parts.

First of all, the pin 133 is inserted in the second horizontal hole 37 of the shoulder 11, as shown in FIG. 11. In this way, the pin 133 is brought inside the pass-through hole 62 of the cylinder 61.

The shaped tool 47, i.e. the hexagonal key, is then inserted in the head of the bead 65 passing through the first hole 37 of the shoulder 11. By rotating the tool 47 according to the arrow 67, the rotation of the bead 65 is caused to move, so that its tip 66 becomes positioned in the V-shaped cavity 60 of the pin 133, blocking it (FIG. 12).

The blockage between the parts obtained by the action of the bead 65 creates a series of forces at play according to the scheme shown in FIG. 12. The arrows show the forces acting between the shoulder 11 and the base 12 of the piece of furniture and between the parts of the joining device, also in this embodiment.

FIGS. 13 to 16 show, in sectional and perspective views, a fourth embodiment of a joining device for parts of furniture and furnishing items, very similar to that of FIGS. 9 to 12.

In this further example, the same elements are indicated with the same reference numbers.

In this example, it can be observed that a seat S1 in the form of a vertical blind hole 36 is provided in the shoulder 11, which intersects with a single enlarged horizontal blind hole 137 in substitution of the two holes 37 and 38 of the previous examples.

Also in this example, a cylinder 61 is housed in the elongated vertical hole 36, in which a pass-through hole 62 is provided in an intermediate portion, which is perpendicular to the axis of the cylinder 61 and suitable for receiving the pin 133. An upper portion of the cylinder 61 contains a further hole 63 produced according to a tilted direction with respect to the axis of the cylinder 61, directed downwards towards the intermediate portion of the cylinder 61.

Both the hole 62 and the hole 63 face each other in the single enlarged horizontal blind hole 137 of the shoulder 11.

Obviously, also in this case, the joining device of the present invention essentially comprises a blocking group GB (61, 63, 65) inserted inside a seat S1 or elongated vertical hole 36 of the shoulder 11 which acts on a pin connection group GC (133, 60) to be blocked, positioned inside a seat S2 of the base 12 and which extends from a horizontal hole 30 formed at the side of the base 12 itself.

The approaching and tightening operation of the parts is facilitated as only one hole 137 is provided.

Figure 14:
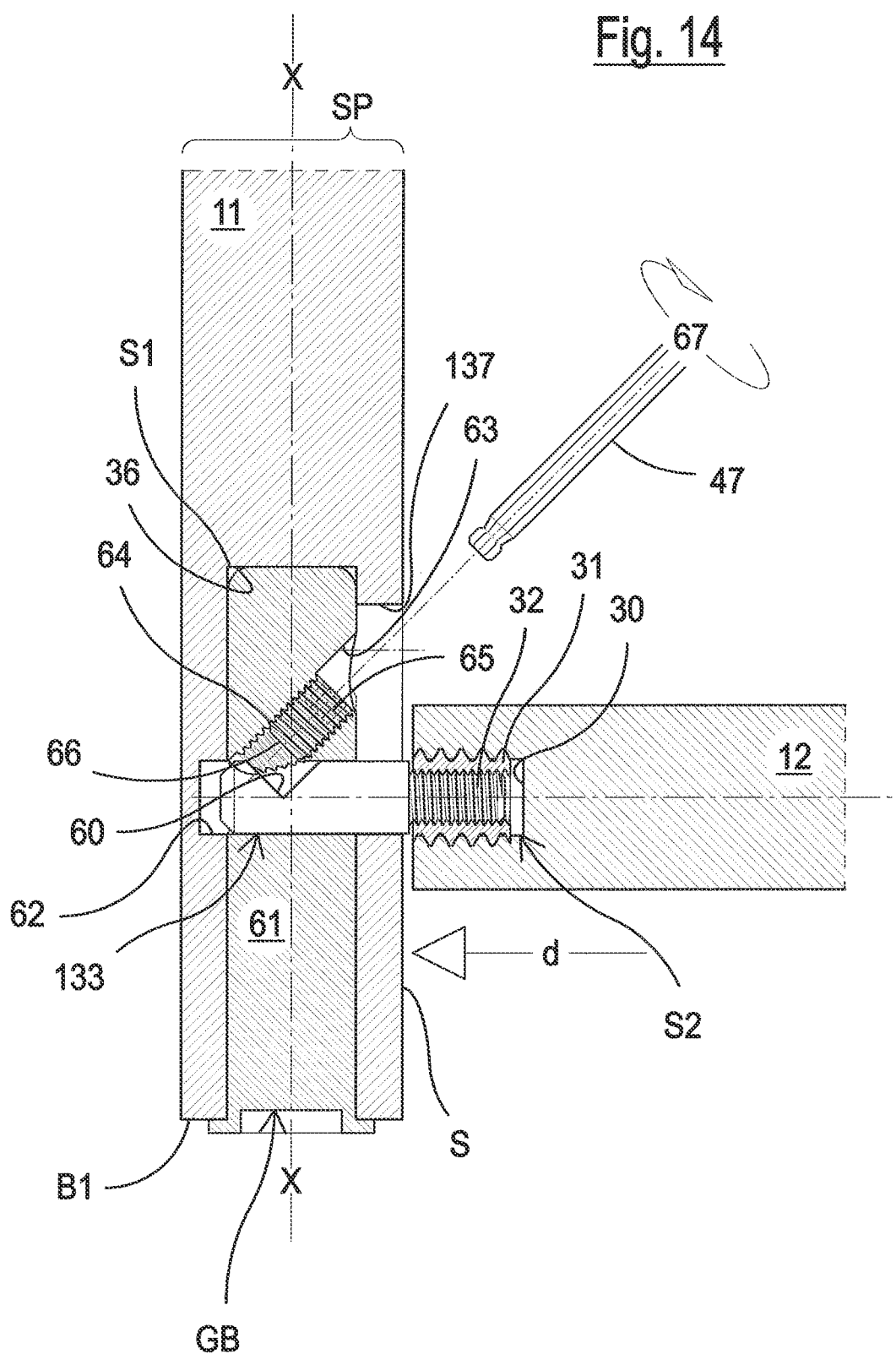
FIG. 14 is a sectional view of the device of FIG. 13 with said parts juxtaposed with respect to each other and partially inserted in each other.
Figure 15:
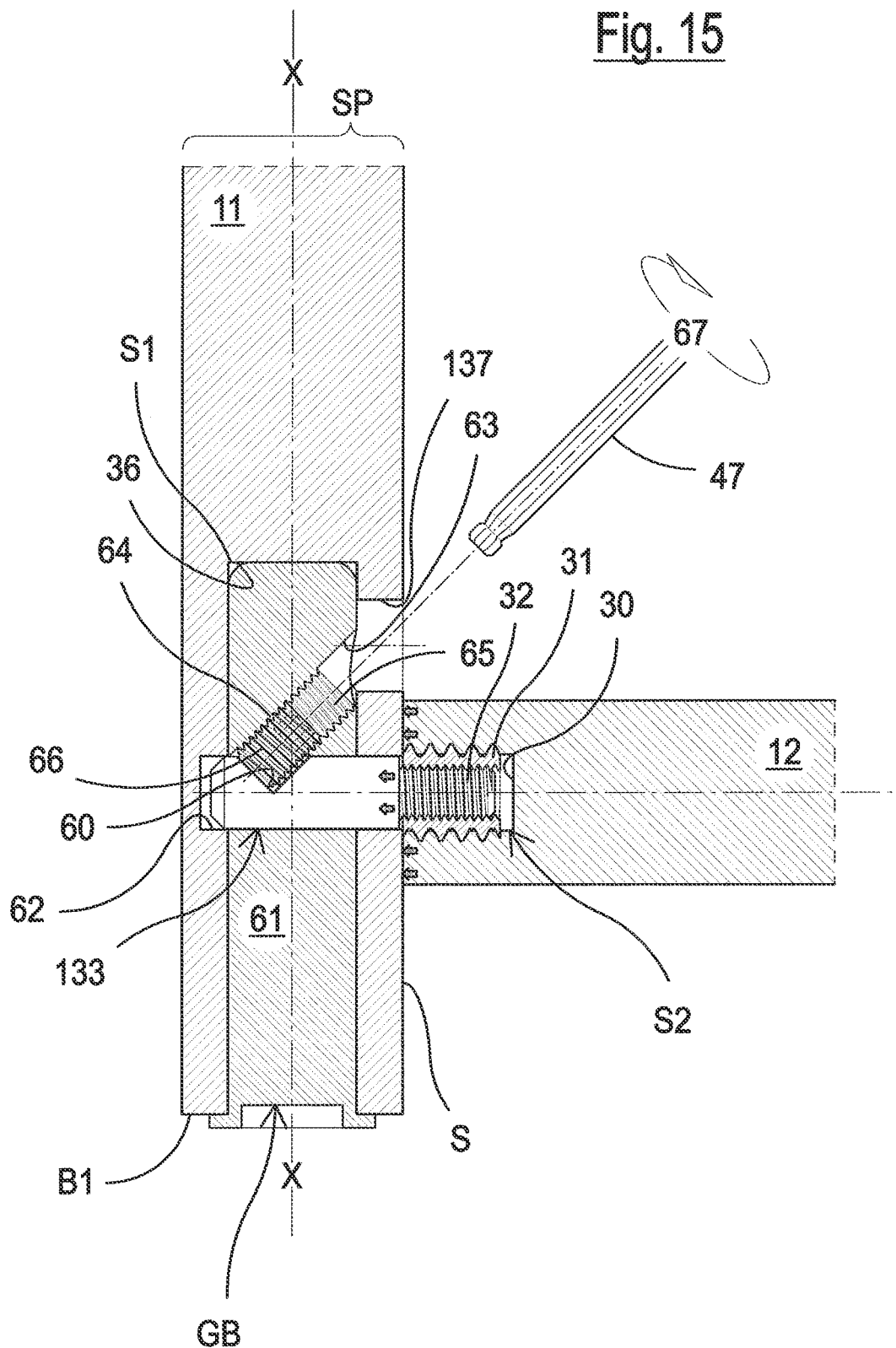
FIG. 15 is a sectional view of the device of FIG. 13 with said parts completely inserted in each other and tightened.

As already indicated, FIG. 14 shows the parts juxtaposed and partially inserted in each other, whereas FIG. 15 shows these parts completely inserted and tightened with respect to each other. FIG. 16 illustrates a perspective and partly sectional view of the joining device as it appears from above when it has been positioned and actuated and also shows how there are more than one hole for connecting a shoulder 11 with a base or similar panel 12.

These four embodiments of the invention show, first of all, how the problem associated with the visibility of the device has been advantageously solved. The formation of an activation area on the shoulder of the piece of furniture creates an aesthetically valid appearance.

Furthermore, any possible caps positioned in the holes do not interfere with what is resting on the base of the furniture which is free of any type of hole.

In this way, there are no obstacles on the base for the insertion of any object, eliminating any type of protrusion, even minimum, with respect to the upper surface of the base.

Holes produced on the shoulder are not particularly visible to an observer with respect to holes on the base as in the known art, thus obtaining a high aesthetical value.

The elimination of holes that intersect with each other on the base eliminates any possible weakening of the base itself that can therefore sustain high loads without there being any danger of a possible cause of breakage of the base.

Finally, a joining device according to the present invention advantageously allows the two panels to be connected, to be prepared before the connection operation. On the one hand, in fact, the blocking group GB is inserted inside the seat S1 of a panel 11 before the final coupling of the two panels 11, 12, and on the other, also at least part of the connection group GC, i.e. the pin, is assembled in the other panel 12 before the final coupling of said panels 11, 12. The joining is then effected by simply using a suitable tool without the addition or insertion of other elements, with extreme simplicity and safety and without having to resort to centering operations between the parts.

The forms of the structure for the production of a joining device of the present invention, as also the materials and assembly modes, can naturally differ from those shown for purely illustrative and non-limiting purposes in the drawings.

The objectives mentioned in the preamble of the description have therefore been achieved.

The protection scope of the present invention is defined by the enclosed claims.

The invention claimed is:

1. A joining device with minimum visibility for parts of furniture and furnishing items, joining a first panel and a second panel, which must be moved towards each other according to an approach direction to bring a face of the first panel in a tightening position against a side of the second panel, said joining device comprising:
    a blocking group; and
    a connection group,
    at least part of said connection group being assembled in said second panel before final coupling of said first and second panels against each other,
    said first panel comprising a seat for said blocking group which is contained within a thickness thereof, and
    said seat having a longitudinal axis which is perpendicular to said approach direction, and extends from a side of said first panel towards an inside thereof,
    wherein said blocking group is provided inserted inside said seat before a final coupling of said first and said second panels against each other,
    wherein said blocking group acts on a pin of the connection group to be blocked, the pin being positioned in a first opening defined in the face of the first panel and extending from a hole formed in the side of said second panel,
    wherein said blocking group comprises a rotating cam in said seat of said first panel, which engages said pin and which is provided with an activation element for rotation, said rotating cam being rotatable around an axis perpendicular to the side of the first panel, and
    wherein said rotating cam is positioned in an intermediate portion of a cylinder which provides, in an upper portion, a perimetric toothing, embedded with respect to a side surface of the cylinder and accessible through a second opening defined on a face of said first panel, the perimetric toothing being adapted to be engaged by an operating tool inserted in the second opening.

2. The joining device according to claim 1, wherein said connection group is shaped as a screw having an enlarged head, said screw being positioned integrally in a bush of the second panel.

3. The joining device according to claim 1, wherein said rotating cam is shaped as a curved wall, which forms a toothing having a variable profile.

* * * * *